(12) United States Patent
Schumacher et al.

(10) Patent No.: US 7,658,907 B2
(45) Date of Patent: Feb. 9, 2010

(54) TITANIUM-ALUMINIUM MIXED OXIDE POWDER

(75) Inventors: Kai Schumacher, Hofheim (DE); Roland Schilling, Freigericht (DE); Harald Alff, Kahl (DE); Helmut Roth, Mainaschaff (DE)

(73) Assignee: Degussa GmbH, Duesseldorf (DE)

( * ) Notice: Subject to any disclaimer, the term of this patent is extended or adjusted under 35 U.S.C. 154(b) by 213 days.

(21) Appl. No.: 11/722,782

(22) PCT Filed: Dec. 20, 2005

(86) PCT No.: PCT/EP2005/056937

§ 371 (c)(1),
(2), (4) Date: Jun. 25, 2007

(87) PCT Pub. No.: WO2006/067128

PCT Pub. Date: Jun. 29, 2006

(65) Prior Publication Data

US 2008/0096755 A1    Apr. 24, 2008

(30) Foreign Application Priority Data

Dec. 23, 2004   (DE) ................. 10 2004 062 104

(51) Int. Cl.
*C01G 23/047* (2006.01)
*C01B 13/14* (2006.01)

(52) U.S. Cl. .................. 423/610; 423/592.1; 423/625

(58) Field of Classification Search ................. 502/350, 502/351, 355; 423/593.1, 610, 612
See application file for complete search history.

(56) References Cited

U.S. PATENT DOCUMENTS

| 4,196,101 | A | * | 4/1980 | Wilson et al. ............. 502/221 |
| 5,762,914 | A | | 6/1998 | Hartmann et al. |
| 6,992,042 | B2 | * | 1/2006 | Hemme et al. ............. 502/350 |

FOREIGN PATENT DOCUMENTS

| EP | 0 595 078 | 5/1994 |
| EP | 1 138 632 | 10/2001 |

OTHER PUBLICATIONS

U.S. Appl. No. 11/569,415, filed Nov. 20, 2006, Schumacher, et al.
U.S. Appl. No. 11/568,860, filed Nov. 9, 2006, Schumacher, et al.

* cited by examiner

*Primary Examiner*—Timothy C Vanoy
*Assistant Examiner*—Richard M Rump
(74) *Attorney, Agent, or Firm*—Oblon, Spivak, McClelland, Maier & Neustadt, L.L.P.

(57) ABSTRACT

Titanium-aluminium mixed oxide powder with a proportion of aluminium oxide of less than 1 wt. % or a proportion of titanium dioxide of less than 5 wt. %, wherein the sum of the proportions of titanium dioxide and aluminium oxide is at least 99.7 wt. %. It is produced by transferring a vaporous starting compound of the quantitatively greater component of the mixed oxide into a mixing chamber by means of primary air and a vaporous starting compound of the quantitatively smaller component of the mixed oxide by means of an inert gas, and burning the mixture mixed with hydrogen in a mixing chamber into a reaction chamber. It can be used as a catalyst support.

17 Claims, 1 Drawing Sheet

TITANIUM-ALUMINIUM MIXED OXIDE POWDER

Figure 1:
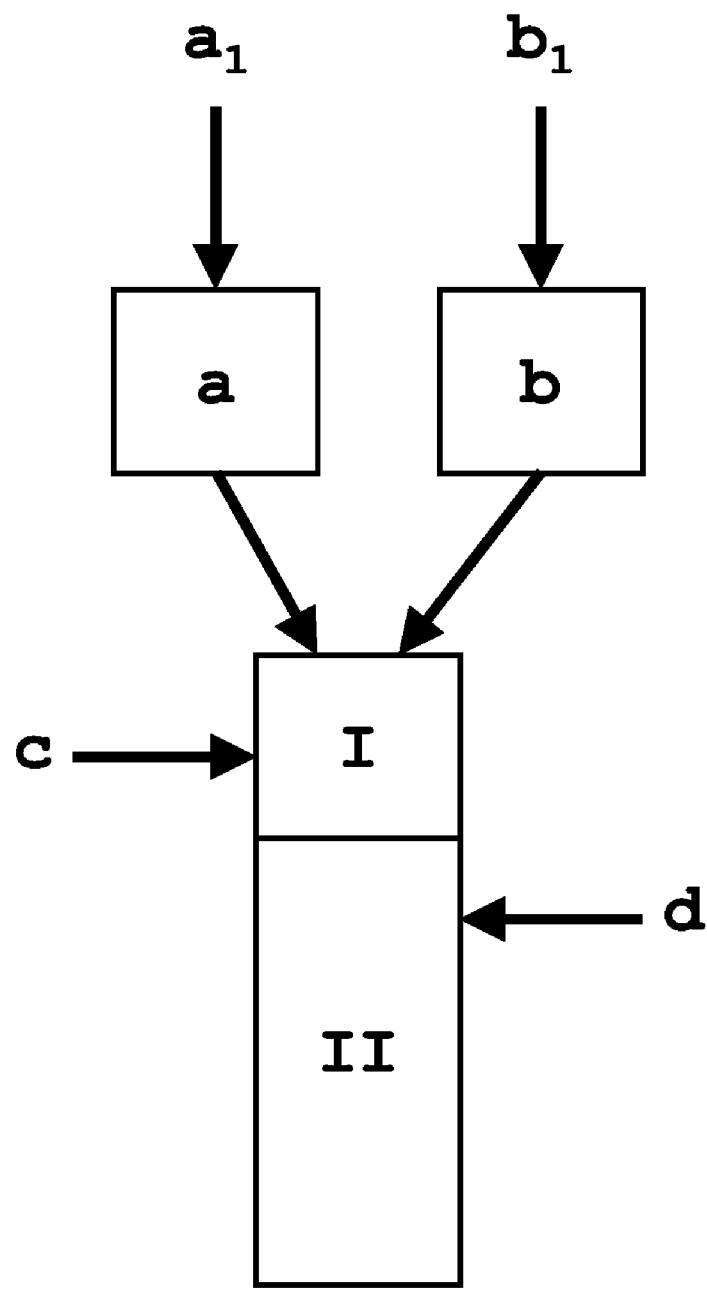

The invention relates to a titanium-aluminium mixed oxide powder, the production and the use thereof.

In DE-A-3611449, a titanium-aluminium mixed oxide powder is disclosed, which contains 5 to 95 wt. % aluminium oxide or titanium dioxide. The mixed oxide powder is obtained by a flame hydrolysis process, in which anhydrous aluminium chloride is transferred into a mixing chamber by means of an inert gas, mixed with hydrogen and titanium tetrachloride there and the mixture is burnt in a reaction chamber.

From EP-A-595078, a titanium-aluminium mixed oxide powder is known which contains 1 to 30 wt. % aluminium oxide and has a BET surface area of 10 to 150 m$^2$/g and a rutile content of 20% to 90%. It is produced by mixing vaporous aluminium chloride with hydrogen, air and vaporous titanium tetrachloride in the mixing chamber of a burner and burning the mixture.

From DE-A-3633030, a titanium-aluminium mixed oxide powder is known which contains 20 to 70 wt. % aluminium oxide and in which titanium dioxide is mainly present in the rutile phase. It is produced by burning a mixture of vaporous aluminium chloride and vaporous titanium tetrachloride in a hydrogen/oxygen flame.

In EP-A-1138632, an aluminium oxide-doped titanium dioxide powder is described, which can have an aluminium oxide proportion of 0.00001 to 20 wt. %. It is obtained by homogeneously mixing an aerosol of an aqueous aluminium salt solution with the gas mixture of a flame hydrolysis consisting of titanium tetrachloride, hydrogen and air, and then burning the mixture. A disadvantage of this process is that at least part of the water introduced with the aerosol reacts with titanium tetrachloride to form titanium dioxide. As a result, on the one hand, a uniform product cannot be obtained and on the other hand, the formation of titanium dioxide leads to caking, which necessitates frequent cleaning of the reactors.

With the above-mentioned processes, it is impossible to obtain a titanium-aluminium mixed oxide powder having an aluminium oxide content of less than 1 wt. % or a titanium dioxide content of less than 5 wt. %.

The object of the invention is to provide a titanium-aluminium mixed oxide powder that is suitable for use as a catalyst support.

It is a further object of the invention to provide a process for the production of the titanium-aluminium mixed oxide powder.

The present invention provides a titanium-aluminium mixed oxide powder in which the proportion of aluminium oxide is less than 1 wt. % or in which the proportion of titanium dioxide is less than 5 wt. %, the sum of the proportions of titanium dioxide and aluminium oxide being at least 99.7 wt. % and the proportions being based on the total quantity of the powder in each case.

The titanium-aluminium mixed oxide powder according to the invention is present in the form of aggregates of primary particles. The primary particles are non-porous. The surfaces of these primary particles exhibit hydroxy groups.

The term "mixed oxide powder" is to be understood as a powder in which an intimate mixing of aluminium oxide and titanium dioxide at the level of the primary particles or aggregates is to be understood. These primary particles exhibit Al—O—Ti bonds. In addition, areas of aluminium oxide can also be present in the primary particles beside titanium dioxide.

The titanium-aluminium mixed oxide powder according to the invention can preferably have an aluminium oxide proportion of 0.05 to 0.8 wt. % and a titanium dioxide proportion of 99.2 to 99.95 wt. %.

Furthermore, a titanium-aluminium mixed oxide powder according to the invention with a titanium dioxide proportion of 0.05 to 4 wt. % and an aluminium oxide proportion of 96 to 99.95 wt. % may be preferred.

The sum of the proportions of titanium dioxide and aluminium oxide in the titanium-aluminium mixed oxide powder according to the invention is at least 99.7 wt. %. The powder can contain up to 0.3 wt. % of impurities. The proportion of impurities is generally less than 0.1 wt. % and thus the sum of the proportions of titanium dioxide and aluminium oxide is at least 99.9 wt. %. The impurities may result from the feed materials or from the production process. Chloride is generally the main impurity.

The rutile proportion in the titanium-aluminium mixed oxide powder according to the invention is not limited. A proportion of at least 10 wt. % is preferred, particularly preferably a proportion of at least 20 wt. %, based on the quantity of titanium dioxide.

The BET surface area, determined in accordance with DIN 66131, of the titanium-aluminium mixed oxide powder according to the invention is not limited. The BET surface area can preferably be 10 to 200 m$^2$/g and particularly preferably 40 to 120 m$^2$/g.

The invention also provides a process for the production of the titanium-aluminium mixed oxide powder according to the invention, in which as the starting compound for the quantitatively greater component of the mixed oxide, a vaporous titanium compound or aluminium compound is transferred into a mixing chamber by means of primary air, the primary air, which can optionally be enriched with oxygen and/or preheated, being introduced in a quantity such that at least 50% of the starting compounds of the first and second mixed oxide components can be converted to the oxides, corresponding to a lambda$_{(Pr)}$ value of at least 0.5, and as the starting compound for the quantitatively smaller component of the mixed oxide, a vaporous aluminium compound or titanium compound is also transferred into the mixing chamber separately from the starting compound for the quantitatively greater component of the mixed oxide by means of an inert carrier gas, the quantities of the starting compounds used being selected such that the mixed oxide powder has an aluminium oxide proportion of less than 1 wt. % or a titanium dioxide proportion of less than 5 wt. %, separately from the vaporous titanium compounds and aluminium compounds, hydrogen is introduced into the mixing chamber and the mixture of the vaporous titanium compounds and aluminium compounds, hydrogen and primary air is ignited in a burner and the flame is burnt into a reaction chamber, the solid is then separated from gaseous substances, and the solid is then freed of chloride as far as possible by treating with steam at temperatures of 250 to 700° C. and in the event that lambda$_{(Pr)}$ is less than 1.0, a quantity of secondary air being fed into the reaction chamber such that a value of lambda$_{(Pr+sec)}$ of at least 1.0 results, and wherein gamma is $\geq 1$.

An essential feature of the process according to the invention is that the starting compound for the quantitatively greater component of the mixed oxide and at least 50% of the air that is stoichiometrically required to convert all the starting compounds into the mixed oxide powder according to the invention are transferred into the mixing chamber together.

Another essential feature is that the starting compound for the quantitatively smaller component of the mixed oxide is transferred into the mixing chamber by means of an inert gas.

It is also essential that, in the event that the air introduced into the mixing chamber is insufficient for complete conversion of the starting compounds into the mixed oxide powder according to the invention, secondary air be introduced into the reaction chamber.

It is also essential for the gamma value to be $\geqq 1$, preferably 1 to 4. Different gamma values permit the production of mixed oxide powders according to the invention with (approximately) the same BET surface area and a variable rutile content. A higher rutile content can be obtained by a higher gamma value.

FIG. 1 represents a diagrammatic sketch of the process according to the invention. In this diagram: a=quantitatively greater, vaporous starting compound; $a_1$=primary air; b=quantitatively smaller, vaporous starting compound; $b_1$=inert gas; c=hydrogen; d=secondary air; I=mixing chamber; II=reaction chamber.

The vaporous titanium compounds and aluminium compounds are converted to the corresponding metal oxide by either hydrolysis or oxidation. Suitable compounds can be halides, nitrates, alcoholates and/or carboxylates.

The hydrolysis can be represented as follows, based on the preferably used compounds titanium tetrachloride and aluminium chloride, the water arising from the reaction of the (atmospheric) oxygen with hydrogen:

$$TiCl_4+2H_2O \rightarrow TiO_2+4HCl; \ 2AlCl_3+3H_2O \rightarrow 2Al_2O_3+6HCl$$

Gamma and lambda are defined as follows:
Gamma=$H_2$ fed in/$H_2$ required stoichiometrically,
Lambda=$O_2$ fed in/$O_2$ required stoichiometrically. Lambda here comprises the total oxygen introduced from primary air and secondary air.

The process according to the invention can preferably be conducted in such a way that lambda$_{(Pr)}$ is 0.7 to 4.

Regardless of whether lambda$_{(Pr)}$ is less than 1, secondary air may be introduced into the reaction chamber in the process according to the invention. Preferably, lambda$_{(Pr+Sec)}$ is >1 to 7.

The invention also provides the use of the titanium-aluminium mixed oxide powder as a catalyst support.

EXAMPLES

Example 1

600 g/h TiCl$_4$ are vaporised. The vapours are transferred into a mixing chamber by means of primary air (11 Nm$^3$/h). Separately from this, 25 g/h AlCl$_3$ are vaporised and likewise transferred into the mixing chamber by means of nitrogen. Separately from titanium tetrachloride and aluminium chloride, 2.2 Nm$^3$/h of hydrogen are introduced into the mixing chamber. In a central tube, the reaction mixture is fed into a burner and ignited. The flame burns into a water-cooled reaction chamber. An additional 17 Nm$^3$/h of secondary air are fed into the reaction chamber. The resulting powder is separated off in a downstream filter and then treated with air and steam in counter-current at approx. 700° C.

Examples 2 to 5 are conducted in the same way as Example 1. The respective amounts used are given in Table 1.

Example 6

1300 g/h AlCl$_3$ are vaporised. The vapours are transferred into a mixing chamber by means of primary air (1.35 Nm$^3$/h). Separately from this, 10 g/h TiCl$_4$ are vaporised and likewise transferred into the mixing chamber by means of nitrogen. Separately from titanium tetrachloride and aluminium chloride, 0.538 Nm$^3$/h of hydrogen are introduced into the mixing chamber. In a central tube, the reaction mixture is fed into a burner and ignited. The flame burns into a water-cooled reaction chamber. An additional 17 Nm$^3$/h of secondary air are fed into the reaction chamber. The resulting powder is separated off in a downstream filter and then treated with air and steam in counter-current at approx. 700° C.

Examples 7 and 8 are conducted in the same way as Example 6. The respective amounts used are given in Table 1.

Table 2 shows the behaviour of the BET surface area of the powders according to the invention from Examples 2 and 6 compared with Aeroxide® TiO$_2$ P 25, BET surface area 45 m$^2$/g (Degussa) and an aluminium oxide sample (Alu 130, BET surface area 130 m$^2$/g) under thermal loading.

Examples 2 and 6 show that even a powder according to the invention with a very low proportion of aluminium oxide or titanium dioxide leads to an increase in the stability of the BET surface area under thermal loadings.

TABLE 1

Substances and amounts used; physico-chemical parameters of the powders obtained

| | | Example | | | | | | | |
|---|---|---|---|---|---|---|---|---|---|
| | | 1 | 2 | 3 | 4 | 5 | 6 | 7 | 8 |
| TiCl$_4$ | g/h | 600 | 4300 | 4300 | 6000 | 6000 | 10 | 25 | 80 |
| AlCl$_3$ | g/h | 25 | 25 | 25 | 42 | 42 | 1300 | 1300 | 1800 |
| Hydrogen | Nm$^3$/h | 2.2 | 2.2 | 2.2 | 1.2 | 2.05 | 0.538 | 0.538 | 0.475 |
| Primary air | Nm$^3$/h | 11 | 14.8 | 6.5 | 10 | 10 | 1.35 | 1.1 | 3 |
| Secondary air | Nm$^3$/h | 17 | 17 | 26 | 20 | 20 | 0 | 0.4 | 0.2 |
| gamma | | | 2.05 | 2.84 | 2.84 | 1.19 | 1.79 | 1.78 | 1.76 | 1.11 |
| lambda$_{(Pr)}$ | | | 1.59 | 2.14 | 0.94 | 2.46 | 1.64 | 0.96 | 0.78 | 2.39 |
| lambda$_{(Pr+Sec)}$ | | | 4.04 | 4.59 | 4.69 | 6.16 | 4.92 | 1.03 | 1.07 | 2.55 |
| Al$_2$O$_3$ content | wt. % | 0.25 | 0.5 | 0.45 | 0.85 | 0.9 | 99.2 | 97.9 | 95.4 |
| TiO$_2$ content | wt. % | 99.7 | 99.4 | 99.3 | 99.1 | 99.0 | 0.7 | 2 | 4.5 |
| Chloride content | wt. % | 0.05 | 0.01 | 0.02 | 0.025 | 0.012 | 0.02 | 0.01 | 0.017 |
| Rutile % | % | 31 | 44 | 46 | 26 | 30 | 15 | 12 | 10 |
| BET | m$^2$/g | 53 | 73 | 64 | 62 | 47 | 104 | 38 | 134 |
| pH | | 3.5 | 3.7 | 3.8 | 3.9 | 4.3 | 4.4 | 4.2 | 4.5 |

TABLE 2

Stability of the BET surface area under heat treatment

| Powder | Al$_2$O$_3$ proportion [wt. %] | BET surface area [m$^2$/g] after 3 h 600° C. | BET surface area [m$^2$/g] after 3 h 1000° C. |
|---|---|---|---|
| TiO$_2$ P 25 | 0 | 41 | 1 |
| Example 2 | 0.5 | 54 | 16 |
| Example 6 | 99.2 | 89 | 31 |
| Al$_2$O$_3$ | 100 | 99 | 22 |

The invention claimed is:

1. A titanium-aluminium mixed oxide powder,
    characterised in that the proportion of aluminium oxide is less than 0.8 wt. % or the proportion of titanium dioxide is less than 5 wt. %, the sum of the proportions of titanium dioxide and aluminium oxide being at least 99.7 wt. % and the proportions being based on the total quantity of the powder in each case; and
    characterised in that the rutile proportion is at least 10 wt. %, based on the quantity of titanium dioxide.

2. The titanium-aluminium mixed oxide powder according to claim 1, characterised in that the proportion of aluminium oxide is 0.05 to 0.8 wt. % and the proportion of titanium dioxide is 99.2 to 99.95 wt. %.

3. The titanium-aluminium mixed oxide powder according to claim 1, characterised in that the proportion of titanium dioxide is 0.05 to 4 wt. % and the proportion of aluminium oxide is 96 to 99.95 wt. %.

4. The titanium-aluminium mixed oxide powder according to claim 1, characterised in that the sum of the proportions of titanium dioxide and aluminium oxide is at least 99.9 wt. %.

5. The titanium-aluminium mixed oxide powder according to claim 1, characterised in that the rutile proportion is at least 20 wt. %, based on the quantity of titanium dioxide.

6. The titanium-aluminium mixed oxide powder according to claim 1, characterised in that the BET surface area is 10 to 200 m$^2$/g.

7. A process for the production of the titanium-aluminium mixed oxide powder according to claim 1, characterised in that
    as the starting compound for the quantitatively greater component of the mixed oxide, a vaporous titanium compound or aluminium compound is transferred into a mixing chamber by means of primary air,
    the primary air, which can optionally be enriched with oxygen and/or preheated, is introduced in a quantity so that at least 50% of the starting compounds of the first and second mixed oxide components can be converted to the oxides, corresponding to a lambda$_{(Pr)}$ value of at least 0.5, and
    as the starting compound for the quantitatively smaller component of the mixed oxide, a vaporous aluminium compound or titanium compound is also transferred into the mixing chamber separately from the starting compound for the quantitatively greater component of the mixed oxide by means of an inert carrier gas,
    the quantities of the starting compounds used being selected so that the mixed oxide powder has an aluminium oxide proportion of less than 1 wt. % or a titanium dioxide proportion of less than 5 wt. %,
    separately from the vaporous titanium compounds and aluminium compounds, hydrogen is introduced into the mixing chamber and the mixture of the vaporous titanium compounds and aluminium compounds, hydrogen and primary air is ignited in a burner and the flame is burnt into a reaction chamber, the solid is then separated from gaseous substances and freed of chloride as much as possible by treating with steam at temperatures of 250 to 700° C. and in the event that lambda$_{(Pr)}$ is less than 1.0, a quantity of secondary air is fed into the reaction chamber so that a value of lambda$_{(Pr+Sec)}$ of at least 1.0 results, and
    wherein gamma is $\geq 1$.

8. The process for the production of the titanium aluminium mixed oxide powder according to claim 7, characterised in that the starting compounds are titanium tetrachloride and aluminium chloride.

9. The process for the production of the titanium aluminium mixed oxide powder according to claim 7, characterised in that lambda$_{(Pr)}$ is 0.7 to 4.

10. The process for the production of the titanium aluminium mixed oxide powder according to claim 7, characterised in that lambda$_{(Pr+Sec)}$ is $\geq 1$ to 7.

11. A catalyst support comprising the titanium-aluminium mixed oxide powder according to claim 1.

12. The titanium-aluminium mixed oxide powder according to claim 1, characterised in that the BET surface area is 40 to 120 m$^2$/g.

13. The titanium-aluminium mixed oxide powder according to claim 1, characterised in that the powder is in a form of aggregates of primary particles.

14. The titanium-aluminium mixed oxide powder according to claim 13, characterised in that the primary particles are non-porous.

15. The titanium-aluminium mixed oxide powder according to claim 13, characterised in that the primary particles have surfaces exhibiting hydroxy groups.

16. The titanium-aluminium mixed oxide powder according to claim 1, characterised in that the proportion of aluminium oxide is less than 0.5 wt. %.

17. The titanium-aluminium mixed oxide powder according to claim 1, characterised in that the proportion of aluminium oxide is less than 0.25 wt. %.

* * * * *